June 17, 1924.　　　　　　　　　　　　　　　　　　　　1,498,018
C. M. CRONKHITE ET AL
GATE VALVE
Filed Dec. 18, 1922　　　2 Sheets-Sheet 1
Fig. 2.　　　　　　　　　Fig. 1.
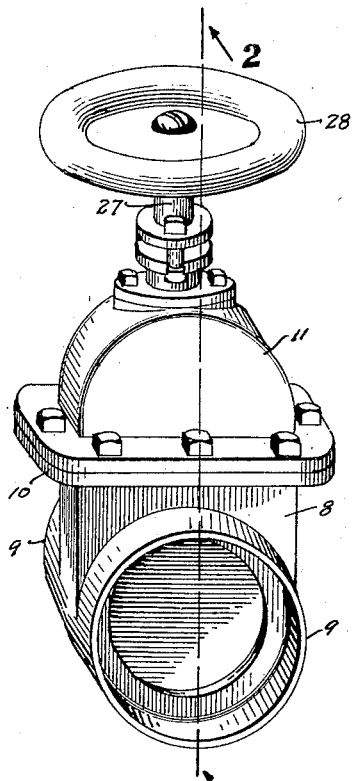
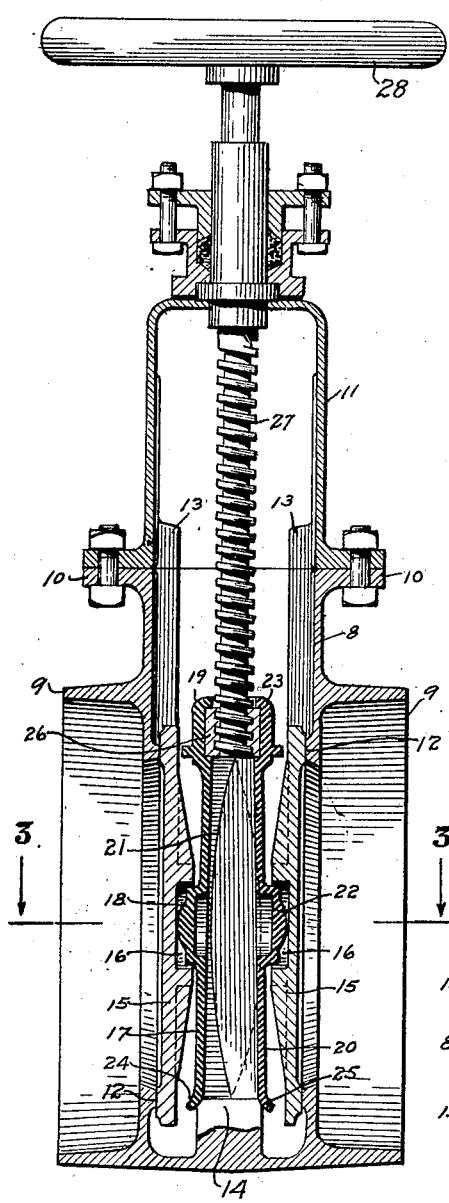
Fig. 3.
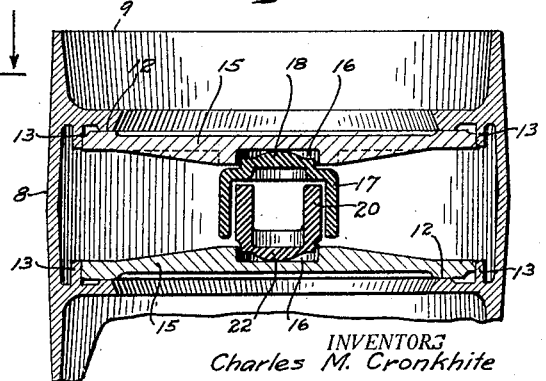
INVENTORS
Charles M. Cronkhite
James O. Tow
BY
Nestall and Wallace
ATTORNEYS June 17, 1924.

C. M. CRONKHITE ET AL 1,498,018

GATE VALVE

Filed Dec. 18, 1922    2 Sheets-Sheet 2

INVENTORS
Charles M. Cronkhite
James O. Tow
BY
Nestall and Wallace
ATTORNEYS

Patented June 17, 1924.

1,498,018

UNITED STATES PATENT OFFICE.

CHARLES M. CRONKHITE AND JAMES O. TOW, OF LOS ANGELES, CALIFORNIA, ASSIGNORS TO MARTIN IRON WORKS, OF LOS ANGELES, CALIFORNIA, A CORPORATION OF CALIFORNIA.

GATE VALVE.

Application filed December 18, 1922. Serial No. 607,502.

*To all whom it may concern:*

Be it known that we, CHARLES M. CRONKHITE and JAMES O. TOW, citizens of the United States, and residents of Los Angeles, in the county of Los Angeles and State of California, have invented new and useful Improvements in Gate Valves, of which the following is a specification.

This invention relates to a gate valve especially adaptable for use in pipe lines of irrigating systems, but also applicable to other uses.

A valve forming a part of an irrigating system is not subject to much care and attention. For this reason it must be simple in structure, economical and durable. Water flowing through the pipes of irrigating systems often carries sticks, plants, and other trash. Valves used in such systems must be of such a character that trash will not interfere with their closure or injure the valve mechanism. The primary object of this invention is to provide a valve structure having the desired features mentioned above. The invention is embodied in a valve having disks which are wedged against their seats when closed. Another object of this invention is to provide operating mechanism for opening and closing the disks, which is economical to manufacture, whose elements are easy to assemble and which is positive in its operation.

Figure 4:
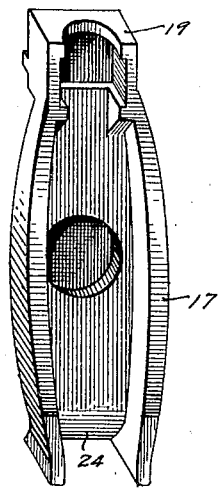
Figure 5:
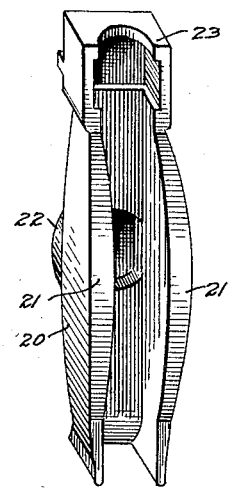
Figure 6:
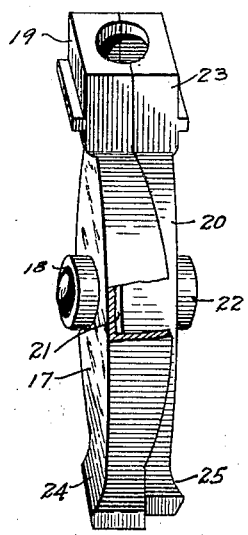
Figure 7:
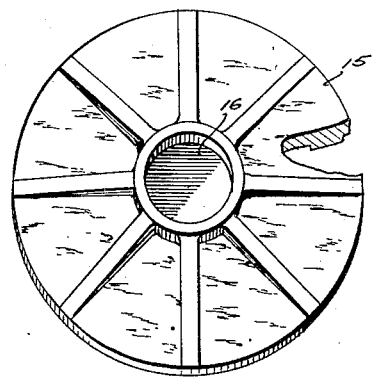

These objects together with other objects and corresponding accomplishments are obtained by means of the embodiment of our invention illustrated in the accompanying drawing, in which:

Fig. 1 is a perspective view of a complete valve; Fig. 2 is a vertical section as seen on the line 2—2 of Fig. 1; Fig. 3 is a section as seen on the line 3—3 of Fig. 2; Figs. 4 and 5 are perspective views of the disk carriage rockers; Fig. 6 shows the rockers illustrated in Figs. 4 and 5 in assembled relation; and Fig. 7 is a perspective view of a valve disk.

Referring more particularly to the drawing, the valve cage or body is indicated by 8, it comprising a chamber for the valve disks and having ports at opposite sides thereof for the passage of water. These ports are surrounded by collars 9 for connection to the pipes. The top of the cage is flanged as indicated by 10 and provided with bolt holes to receive bolts for clamping the head 11 thereto. Within the cage 8 and bordering the port openings are raised annular seats 12 for the valve disk. Ribs 13 extend vertically and assist in guiding the valve disks as they are raised and lowered. Formed in the bottom of the cage at the center thereof is a wedge 14 adapted to be disposed between the disk carriage rockers.

The disks 15 are of circular form and provided at their centers with socket recesses 16 for receiving the bosses of the disk carriage rockers. The disks are shown with strengthening ribs upon the back and raised faces to engage the seats 12.

The disk carriage comprises a channel rocker 17 having a boss 18 on the outer face thereof. A box 19 for a nut is formed at the upper end thereof. Nesting within the rocker 17 is a channel rocker 20 having rocker edges indicated by 21. A boss 22 is formed on the outer face and at the upper end is a box 23 for the nut. The lower ends of the channels flare outwardly as indicated by 24 and 25 to receive the wedge 14.

Disposed within the box portions 19 and 23 is a square nut 26. Engaged with the nut is a threaded stem 27 passing through a suitable gland structure in the head 11 and having a hand wheel 28 for its operation. The gland is so constructed that the stem may be rotated but will have no axial movement.

In assembling the structure, the rockers are nested together with the nut in the boxes at the top thereof. The disks 15 are mounted upon the bosses 18 and 22 and slipped into position in the cage. The head is then fastened to the cage, and the valve may be opened and closed by raising and lowering the disk carriage. This is accomplished by turning the wheel 28. When the carriage reaches its lower position, the wedge 14 enters between the flared portions of the rockers, and continued movement downwardly causes the rockers to be spread apart and the disks to be pressed against their seats. The wedging only takes place after the disks have reached their seating position.

It will be noted that substantially all of the valve structure can be cast. The simplicity and economy in construction and assemblage is apparent from the foregoing description.

What we claim is:

1. A gate valve comprising a housing having a port opening, a valve disk slidable transversely across said opening, a carriage upon which said disk is supported for raising and lowering said disk composed of rocker members resting against one another and formed at the upper end with recesses to provide a nut box, a nut in said box, a wedge in said housing for entrance between said rockers at the lower end of the travel of the carriage when said disk is in register with said opening so as to spread the rockers and press said disk against its seat, and a threaded stem engaged with said nut for raising and lowering said carriage.

2. A gate valve comprising a housing having aligned port openings for passage of fluid, a valve disk for each of said port openings slidable transversely across its opening, a carriage for raising and lowering said disks composed of rockers resting against one another and formed at the upper end with recesses to provide a nut box, a nut in said box, a valve disk being supported upon each rocker, a wedge in said housing for entrance between said rockers at the lower end of the travel of the carriage when said disks are in register with said openings so as to spread the rockers and press said disks against their seats, and a threaded stem engaged with said nut for raising and lowering said carriage.

3. A gate valve comprising a housing having a port opening, a valve disk slidable transversely across said opening, a carriage composed of rockers resting against one another and formed with a nut box, said disk and a rocker being loosely connected by a socket and boss, a wedge in said housing for entrance between said rockers at the lower end of the travel of the carriage when lower disk is in register with said opening so as to spread the rockers and press said disk against its seat, and a threaded stem engaged with said nut for raising and lowering said carriage.

4. A gate valve comprising a housing having aligned port openings for passage of fluid, valve disks slidable transversely across said openings, a carriage for raising and lowering said disks composed of rockers resting against one another and formed at the upper end with recesses to provide a nut box, a nut in said box, said disks and rockers being loosely connected by sockets and bosses, a wedge in said housing for entrance between said rockers at the lower end of the travel of the carriage when said disks are in register with said openings so as to spread the rockers and press said disks against their seats, and a threaded stem engaged with said nut for raising and lowering said carriage.

5. A gate valve comprising a housing having aligned port openings for passage of fluid, valve disks slidable transversely across said openings, a carriage for raising and lowering said disks comprising channel rockers one nesting within the other and formed with a nut box at the top, a nut in said box, said disks and rockers being loosely connected by sockets and bosses, a wedge in said housing for entrance between said rockers at the lower end of the travel of the carriage when said disks are in register with said openings so as to spread the rockers and press said disks against their seats, and a threaded stem engaged with said nut for raising and lowering said carriage.

6. A gate valve comprising a housing having aligned port openings for passage of fluid, valve disks slidable transversely across said openings and having socket recesses at the center thereof, a carriage for raising and lowering said disks comprising channelled rockers, one nesting within the other, said rockers each having bosses for disposal within the sockets of said disks and formed at the top with a nut box, a nut in said box, said rockers having their channels at the bottom flared outwardly, a wedge in said housing for entrance between said rockers at the flared ends when said disks are in register with said openings so as to spread the rockers and press said disks against their seats, and a threaded stem engaged with said nut for raising and lowering said carriage.

In witness that we claim the foregoing we have hereunto subscribed our names.

CHARLES M. CRONKHITE.
JAMES O. TOW.